United States Patent
Petersen et al.

(10) Patent No.: US 12,348,067 B2
(45) Date of Patent: Jul. 1, 2025

(54) RECONFIGURABLE BATTERY PACK

(71) Applicant: LENOVO (SINGAPORE) PTE, LTD, Singapore (SG)

(72) Inventors: John M Petersen, Wake Forest, NC (US); Bouziane Yebka, Apex, NC (US); Nathan Peterson, Durham, NC (US); Gary D Cudak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 859 days.

(21) Appl. No.: 17/561,813

(22) Filed: Dec. 24, 2021

(65) Prior Publication Data

US 2023/0208166 A1    Jun. 29, 2023

(51) Int. Cl.
*H02J 7/00* (2006.01)
*H01M 10/42* (2006.01)

(52) U.S. Cl.
CPC ....... *H02J 7/0047* (2013.01); *H01M 10/4257* (2013.01); *H01M 2010/4271* (2013.01); *H01M 2220/20* (2013.01); *H01M 2220/30* (2013.01)

(58) Field of Classification Search
CPC ........... H01M 10/4257; H01M 10/633; H01M 10/48; H01M 2010/4271; H01M 2220/20; H02J 7/0047
See application file for complete search history.

(56) References Cited

U.S. PATENT DOCUMENTS

| 2019/0245237 A1* | 8/2019 | Qiao | H02J 7/0025 |
| 2020/0274371 A1* | 8/2020 | Kirleis | B64D 27/24 |

OTHER PUBLICATIONS

Linear Technology, LTC2990, Quad I2C Voltage, Current and Temperature Monitor, LT 1116 Rev E, 2010 (26 pages).
Linear Technology, LTC4151, High Voltage I2C Current and Voltage Monitor, LT 0314 Rev F, 2008 (18 pages).
Microchip Technology, Inc., MCP73841/2/3/4, Advanced Single or Dual Cell Lithium-Ion/Lithium-Polymer Charge Management Controllers, 2004 (24 pages).
Linear Technology, LTC2990, Quad I2C Voltage, Current and Temperature Monitor, Rev F, Nov. 2018 (26 pages).
Texas Instruments, Battery pack: e-bike/e-scooter/light electric vehicle (LEV), Jan. 21, 2021 (https://www.ti.com/solution/battery-pack-ebike-escooter-light-electric-vehicle-lev) (5 pages).
Tan, R., Texas Instruments, Powering Alternative Forms of Transportation with Industrial Battery Packs, LYY185, 2020 (7 pages).

(Continued)

*Primary Examiner* — Christopher P Domone
(74) *Attorney, Agent, or Firm* — Brian J. Pangrle

(57) ABSTRACT

A method can include sensing condition of power cells in a configured multiple power cell pack via a pack management unit; based in part on the sensing, identifying a number of the power cells as a number of target cells via the pack management unit; disabling sensing condition of the number of target cells via the pack management unit; and reconfiguring the multiple power cell pack via the pack management unit to provide a reconfigured multiple power cell pack that provides power without the number of target cells.

20 Claims, 11 Drawing Sheets

(56) References Cited

OTHER PUBLICATIONS

Texas Instruments, BQ76952 3-Series to 16-Series High Accuracy Battery Monitor and Protector for Li-ion, Li-Polymer, and LiFePO4 Battery Packs, SLUSE13B—Jan. 2020—Revised Nov. 2021 (86 pages).

Mitsubishi Electric, Battery Management Unit 2017 (https://www.mitsubishielectric.co.jp/automotive/tms2017/english/system/pdf/battery_management_unit.pdf) (3 pages).

Sanino, E., Introduction to Battery Management Systems, Feb. 8, 2021 (https://www.allaboutcircuits.com/technical-articles/introduction-to-battery-management-systems/) (11 pages).

Texas Instruments, BQ7718 Overvoltage Protection for 2-Series to 5-Series Cell Li-ion Batteries with Internal Delay Timer, SLUSAX1L—Dec. 2012—Revised Jun. 2021 (28 pages).

\* cited by examiner

RECONFIGURABLE BATTERY PACK

TECHNICAL FIELD

Subject matter disclosed herein generally relates to technology for one or more electrochemical cells.

BACKGROUND

Electrochemical cells include, for example, lithium-ion cells. Such cells can be repeatedly charged and discharged. Various technologies and techniques described herein pertain to electrochemical cells such as, for example, one or more lithium-ion cells of a lithium-ion battery.

SUMMARY

A method can include sensing condition of power cells in a configured multiple power cell pack via a pack management unit; based in part on the sensing, identifying a number of the power cells as a number of target cells via the pack management unit; disabling sensing condition of the number of target cells via the pack management unit; and reconfiguring the multiple power cell pack via the pack management unit to provide a reconfigured multiple power cell pack that provides power without the number of target cells. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
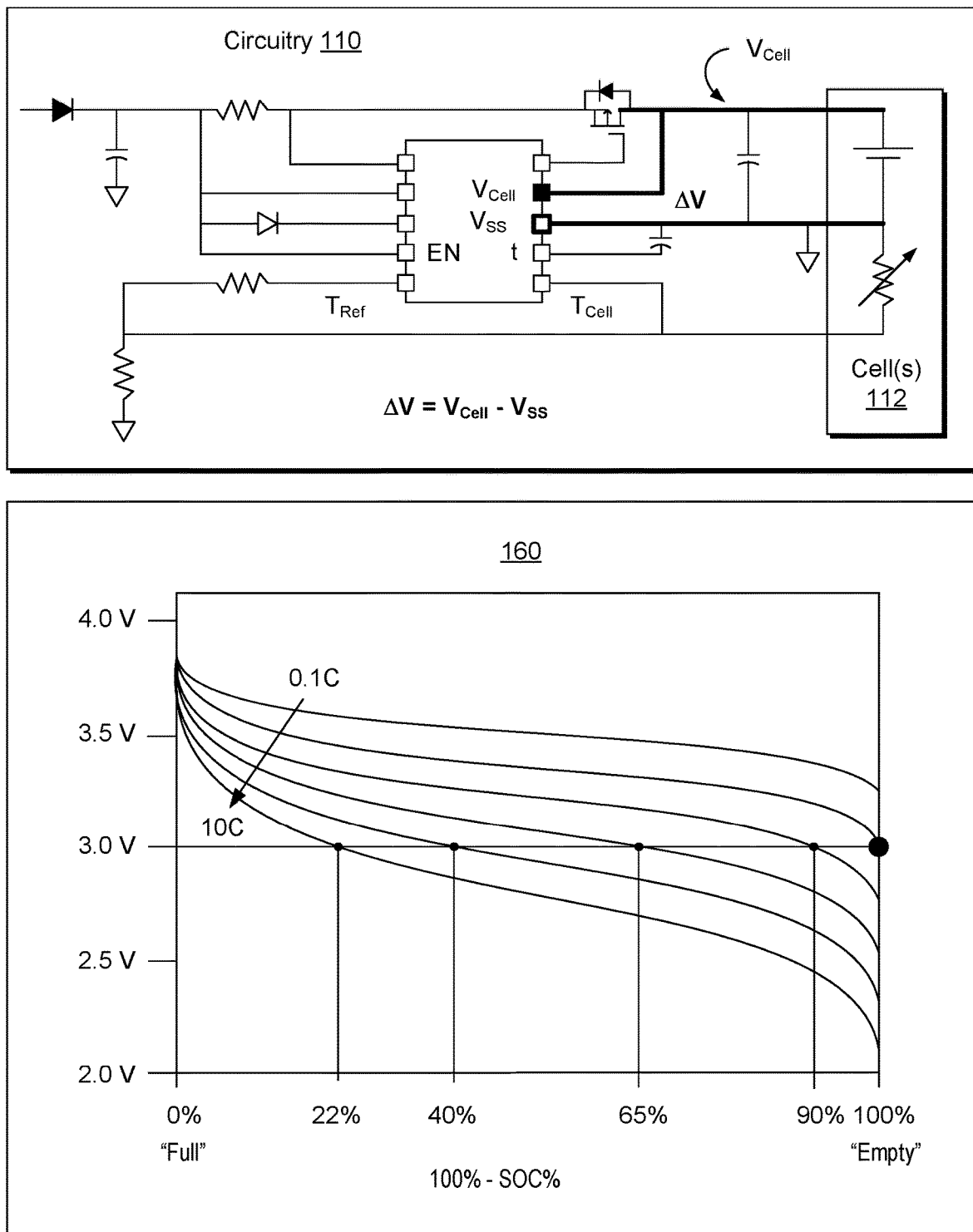
FIG. 1 is a diagram of an example of circuitry operatively coupled to one or more cells of a battery and an example of a plot of voltage versus state of charge (SOC) for various discharge rates of a battery.

FIG. 1 shows an example of circuitry 110 for managing one or more electrochemical cells 112 and an example of a plot 160 of voltage versus state of charge (SOC) with respect to various discharge rates, ranging from approximately 0.1 C to approximately 10 C. As to SOC, in the plot 160, it is shown in terms of utilization where 100 percent corresponds to utilization of 100 percent of a "full" charge; thus, 0 percent corresponds to a "full" charge and 100 percent corresponds to what may be considered to be "empty" or no charge. In the plot 160, the x-axis may be viewed with respect to time. For example, the x-axis can be a time axis where the voltage changes as indicated by the curves given a relatively constant discharge rate. As an example, the circuitry 110 and the cell(s) 112 can be a battery assembly; noting that a battery assembly can include, alternatively or additionally, one or more other types of circuitry.

A charge rate and/or a discharge rate may be referred to as a C-rate and be specified using a numeric value followed by the capital letter "C". A C-rate specifies the speed a battery is charged or discharged. Speed may be relatively constant for an application(s), function(s), etc., or, for example, speed may vary with respect to time as application (s), function(s), etc., change. As to C-rate, at 1 C, a battery charges and discharges at a current that is on par with a marked Ah rating (e.g., as specified by a manufacturer, etc.). At 0.5 C, the current is half and the time is doubled, and at 0.1 C the current is one-tenth and the time is 10-fold.

The capacity of a battery may be rated with respect to a C-rate, for example, a battery rated at 1 C means that a fully charged battery rated at 1 Ah can be expected to provide 1 A for one hour (h). The same battery discharging at 0.5 C can be expected to provide 500 mA for two hours (2 h), and at 2 C, 2 A for 30 minutes (0.5 h).

As to the term load, it defines the current that is drawn from a battery. Internal battery resistance and depleting state of charge (SOC) can cause voltage to drop under load, which can in some instances trigger an end of discharge (e.g., termination of discharge or discharging). Power relates to current delivery measured in watts (W); energy is the physical work over time measured in watt-hours (Wh).

As to the terms specific energy and gravimetric energy density, these define battery capacity in weight (Wh/kg); whereas, the term volumetric energy density defines battery capacity with respect to volume in liters (Wh/l). As an example, a lithium ion battery may be of a volumetric energy density that is in a range of about 10 Wh/l to more than 1,000 Wh/l. Where a device that includes circuitry with an expected load that is to be powered by a lithium ion battery and intended to be compact, such a device can benefit from a higher volumetric energy density battery as a higher volumetric energy density may allow for the device to be more compact (e.g., when compared to a battery with a lower volumetric energy density for the expected load).

As illustrated in the plot 160, consider the x-axis representing time, for a battery operated at a higher discharge rate (e.g., 10 C) with a fixed cut-off voltage (e.g., 3.0 V), circuitry that manages the battery will terminate discharging of the battery sooner, which can limit its usage capacity. For example, the 10 C discharge rate may cause the circuitry to terminate discharging when the voltage of the battery reaches the 3.0 V cut-off value such that the battery still has a remaining useful capacity of tens of percent (e.g., in the plot 160, about 78 percent). In contrast, at a lesser discharge rate, the voltage of the battery will reach the 3.0 V cut-off at a time when a greater percentage of the capacity of the battery has been used.

A cut-off voltage is a voltage at which discharge of a battery may be terminated to reduce risk of damage to the battery. Circuitry operatively coupled to a battery may act to terminate discharge (e.g., discharging) of a battery once the voltage reaches the cut-off voltage. A cut-off voltage can be considered a lower-limit voltage at which battery discharge is considered complete.

Cut-off voltage can differ from one type of battery to another. For example, a NiMH or NiCd battery can have a cut-off voltage of 1.0 V per cell; whereas, 0.9 V can be used as the cut-off voltage of an alkaline cell. As an example, a single-cell lithium ion battery that powers a mobile phone may have a cut-off voltage of 3.3 V where the mobile phone discharges at a discharge rate that utilizes greater than about 92% of the capacity of the single-cell lithium ion battery (at room temperature).

As to risk of damage, a voltage cut-off below 3.2 V for some types of lithium ion batteries can lead to chemical instability, which can reduce battery lifetime. A cut-off voltage of 3.3 V for some types of lithium ion batteries can, for some devices, maintain battery stability such that replacement may not be necessary by a user (e.g., a consumer, etc.) during the useful lifetime of a device.

As shown in FIG. 1, management circuitry 110 includes an integrated circuit with 10 pins. The pins may include charge current sense input, battery management input supply, charge status output, logic enable, cell temperature sensor bias, cell temperature sensor input, timer set, cell management 0 V reference, cell voltage sense, and drive output. As to protection features, a cell temperature sensor bias feature may provide for a voltage reference to bias an external thermistor for continuous cell temperature monitoring and prequalification while a cell temperature sensor input feature may provide for input for an external thermistor for continuous cell temperature monitoring and prequalification (optionally may be disabled by applying a set voltage) and safety timers (e.g., preconditioning, fast charge, elapsed time termination, etc.) that may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle.

As an example, a cell voltage sense function (e.g., implemented in part via the pin labeled "$V_{Cell}$") can provide for monitoring voltage at, for example, a positive terminal of a cell (e.g., for single, dual, etc., series cell packs with coke or graphite anodes) with respect to a reference that is based on the negative terminal of a cell (see, e.g., the pin labeled $V_{SS}$). Thus, the management circuitry 110 can measure voltage (e.g., $\Delta V$) as a difference between a cathode potential ($V_{cathode}$, as applied at the pin $V_{Cell}$) and an anode potential ($V_{anode}$, as applied at the pin $V_{SS}$). As an example, a specified voltage ($\Delta V_{REG}$) may be a limit for $\Delta V$.

As an example, circuitry, which may be referred to as monitoring circuitry or management circuitry, may provide information as to voltage of a battery or batteries. As an example, voltage may be in the form of $V_{Cell}$ such as in the example management circuitry 110 of FIG. 1.

As an example, the management circuitry 110 may operate stand-alone or in conjunction with one or more other circuits (e.g., a host controller, etc.). Management circuitry may apply constant current followed by constant voltage to charge one or more cells. As an example, charger circuitry may include a MCP7384X family chip (Microchip Technology, Inc., Chandler, Arizona), which is described in a document entitled "Advanced Single or Dual Cell Lithium-Ion/Lithium-Polymer Charge Management Controllers" (Microchip Technology, Inc., 2004), which is incorporated by reference herein. As described herein, the term "lithium-ion" includes, for example, "lithium-polymer" as well as "lithium-ion polymer". Management circuitry may be provided with a battery, a package, a device, as part of dedicated power circuitry (e.g., a battery charger), etc.

Management circuitry may be configured to manage, to varying extent, state-of-charge (SOC) mismatch and capacity/energy; noting that as the number of cells and load currents increase, the potential for mismatch can also increase. Though SOC may be more common, each type of mismatch problem may limit capacity (mAh) of a pack of cells to capacity of the weakest cell.

In the example of FIG. 1, the cell(s) 112 can be one or more lithium-ion cells, which can be in the form of one or more lithium-ion batteries. As an example, the cell(s) 112 may include a polymer composite material such as polyethylene oxide or polyacrylonitrile that includes lithium salt. Such a cell or cells may be referred to as a lithium-ion battery (or batteries) or a lithium-ion polymer battery (or batteries) or a lithium-polymer battery (or batteries) (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness on the order of about 0.1 mm). LiPo cells may include a stacked construction formed by stacking electrode and electrolyte materials in a flat sandwich (e.g., defined by length, width and height dimensions). Stacked layers may be packed in a package (e.g., the pouch package 130) in a flat, rolled or other configuration. LiPo cell capacities can include capacities in a range, for example of about 50 mAh (e.g., for a small cell such as for a Bluetooth headset) to about 10 Ah or more for an electric vehicle (e.g., electric or hybrid). As an example, a battery assembly can include one or more LiPo cells and circuitry that can manage one or more aspects of such one or more LiPo cells. As an example, such circuitry may be powered by a separate cell or battery (e.g., a back-up type of battery).

As to function of a lithium-ion cell, lithium ions move from a negative electrode to a positive electrode during discharge and reversely when being charged. As an example, a LiPo cell can include a polyethylene (PE), a polypropylene (PP), a PP/PE, or other material as a separator. Some LiPo cells include a polymer gel containing an electrolyte solution, which is coated onto an electrode surface. For LiPo cells, close packing can allow for a high density.

For lithium-ion cells, when cell voltage drops to a low value (e.g., about 1.5 V), reactions at an anode can produce gas (e.g., over-discharge or "OD"). If voltage continues to drop (e.g., under about 1 V), copper of a copper-based anode current collector can start to dissolve and may short out a cell. When cell voltage increases to a high value (e.g., about 4.6 V), gassing may occur at a cathode as electrolyte may start to decompose (e.g., overcharge or "OC"). As an example, a lower limit as to cut-off voltage may be a gas producing voltage plus a safety factor (e.g., consider a factor of about 5 percent to about 10 percent, etc.).

As an example, a lithium-ion cell or cells may be connected to an external thermal fuse for overcharge protection (e.g., in addition to the control by management circuitry). A normal range may lie between an overcharge region (OC) and an over-discharge region (OD); damage may occur in either of these regions.

As to some examples of battery materials and voltages, consider a $LiCoO_2$ cathode material with a maximum operational potential of about 4.2 V and a $LiMnO_4$ cathode material with a maximum operational potential of about 4.3 V. Such types of batteries may have associated OD voltages, which, as mentioned, may optionally be utilized for purposes of setting a lower limit for adjustments to cut-off voltage(s) where such adjustments may aim to decrease cut-off voltage(s).

In the example of FIG. 1, the management circuitry 110 can reference all inputs and outputs with respect to a management circuit reference potential ($V_{SS}$) that is intended to be a 0 V reference potential. In the circuitry 110, one of the pins, labeled $V_{SS}$, is electrically connected to the "negative" electrode of the cell(s) 112. Specifically, it is electrically connected with the anode(s) of the cell(s) 112. As an example, voltage at the pin labeled $V_{Cell}$ can be measured with respect to a negative electrode (i.e., anode(s)) of the cell(s) 112 (e.g., applied to the pin labeled $V_{SS}$). Such an approach relies on an assumption that the negative electrode (i.e., anode(s)) of the cell(s) 112 (e.g., $V_{SS}$) has a potential of approximately 0 V and remains at approximately 0 V. However, should changes occur to the cell(s) 112, the potential of the anode may not remain constant. As an example, circuitry may optionally adjust for such an occurrence. For example, where an internal reference electrode exists for the cell(s) 112, circuitry may be able to determine whether the assumption for the negative electrode is proper.

As an example, a device or a battery assembly can include circuitry that can determine discharge rate via one or more approaches. For example, discharge rate may be determined by sensing current as discharge current and/or discharge rate may be determined by sensing voltage as a drop in voltage in response to discharge current. As an example, voltage can be of a particular shape with respect to time for a given discharge current. As an example, sensed voltage (e.g., measured voltage) may be processed to determine discharge current where such processing can take into account behavior of voltage in response to discharge current (e.g., drop behavior, forced regime behavior, etc.).

As an example, a discharge rate may be determined based at least in part on voltage as measured by circuitry that includes one or more features of the management circuitry 110. A clock may be implemented using circuitry that can provide for determining a discharge rate. As an example, management circuitry may include a clock and voltage sensing circuitry that can be utilized to determine a discharge rate. In such an example, the voltage sensing circuitry may also be able to determine when a voltage has reached a cut-off voltage for purposes of terminating discharge of a battery (e.g., terminate discharging of a battery). As an example, the management circuitry 110 may include and/or be operatively coupled to current sensing circuitry (e.g., an ammeter, etc.).

Figure 2:
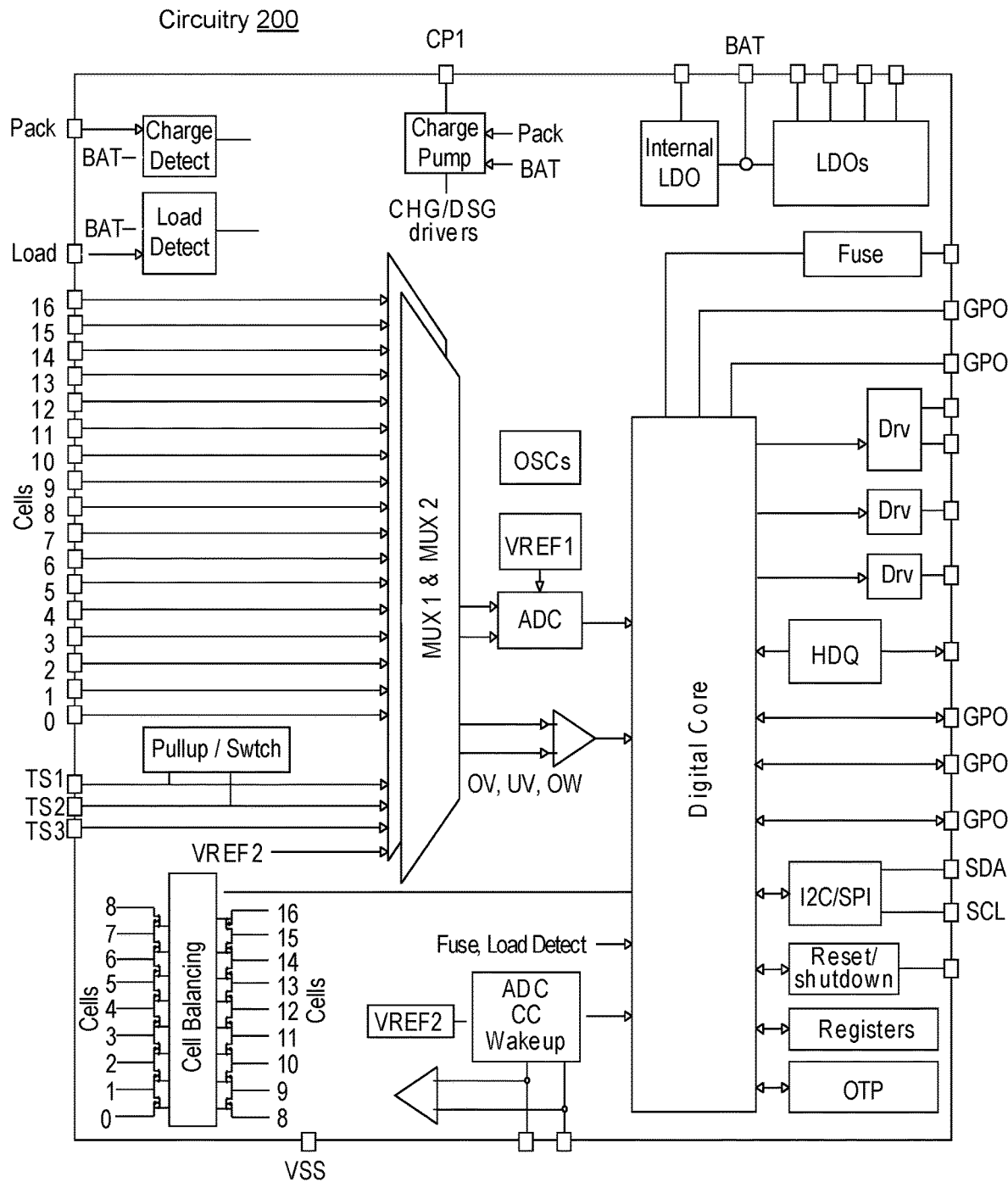
FIG. 2 is a diagram of an example of circuitry.

FIG. 2 shows an example of circuitry 200 that can provide for monitoring and protection for 3-series to 16-series Li-ion, Li-polymer, and $LiFePO_4$ battery packs. In such an example, voltage, current, and temperature measurement can provide data for host-based algorithms and control. A configurable protection subsystem can provide for protections that can be triggered and recovered autonomously by a device or under full control of a host processor. An integrated charge pump can be included with high-side protection NFET drivers, which can allow for host communication with a device even when FETs are off by preserving the ground connection to a pack. In the circuitry 200, dual programmable LDOs can be included for external system use, with each independently programmable to desired voltages (e.g., 1.8 V, 2.5 V, 3.0 V, 3.3 V, and 5.0 V, capable of providing up to 45 mA each). As an example, the circuitry 200 can include various features of the Texas Instruments (TI) BQ76952 3-Series to 16-Series High Accuracy Battery Monitor and Protector for Li-Ion, Li-Polymer, and $LiFePO_4$ Battery Packs, for which a technical reference documents SLUSE13B of January 2020, revised November 2021, is incorporated by reference herein.

The circuitry 200 can include one-time-programmable (OTP) memory for set up of device operations. Multiple communications interfaces can be supported, such as, for example, 400-kHz I2C, SPI, and HDQ one-wire standards. Multiple digital control and status data can be provided through several multifunction pins on a device, including an interrupt to a host processor, and independent controls for host override of each high-side protection NFET. In the example of FIG. 2, three dedicated pins provide for temperature measurements using external thermistors, and multifunction pins can be programmed to use for additional thermistors, supporting a total of up to nine thermistors, in addition to an internal die temperature measurement.

The circuitry 200 includes a single voltage ADC that is multiplexed between measurements of cell voltages of a pack, an internal temperature sensor, and up to nine external thermistors, which may also perform measurements of the voltage at the 16 pin (voltage cell), the Pack pin, the LD pin, the internal REG18 LDO voltage, and the VSS rail (e.g., for diagnostic purposes). The circuitry 200 can support measurement of individual differential cell voltages in a series configuration, ranging from 3-series cells to 16-series cells. In operation, each cell voltage measurement is a differential measurement of the voltage between two adjacent cell input pins, such as VC1-VC0, VC2-VC1, and so forth. The cell voltage measurements can be processed based on trim and calibration corrections, and then reported in 16-bit resolution using units of 1 mV. Raw 24-bit digital output of the ADC may also be available for readout (e.g., using 32-bit subcommands, etc.). In the example of FIG. 2, the cell voltage measurements can support a recommended voltage range from −0.2 V to 5.5 V and the voltage ADC may saturate at a level of 5×VREF1 (approximately 6.06 V) when measuring cell voltages (e.g., recommended to stay at a maximum input of 5.5 V).

Where the circuitry 200 is used in a system with fewer than 16-series cells, the additional cell inputs can be utilized to improve measurement performance. For example, a long connection may exist between two cells in a pack such that there may be significant interconnect resistance between the cells between CELL-A and CELL-B. By connecting VC12 close to the positive terminal of CELL-B, and connecting VC13 close to the negative terminal of CELL-A, more accurate cell voltage measurements are obtained for CELL-A and CELL-B, since the FR voltage across the interconnect resistance between the cells is not included in either cell voltage measurement. As the circuitry can report voltage across the interconnect resistance and the synchronized current, the resistance of the interconnect between CELL-A and CELL-B can also be calculated and monitored during operation.

The circuitry 200 can include capability to calibrate the COV (cell overvoltage) and CUV (cell undervoltage) protection thresholds and to calibrate the internal as well as external temperature measurements. The circuitry 200 can provide secondary protection checks on battery operation and status that can trigger a Permanent Fail (PF) if conditions are considered so serious that the pack should be permanently disabled.

The circuitry 200 can support passive cell balancing by bypassing the current of a selected cell during charging or at rest, using either integrated bypass switches between cells, or external bypass FET switches. The circuitry 200 can incorporate a voltage-based balancing algorithm which can optionally balance cells autonomously without requiring interaction with a host processor or, for example, balancing can be entirely controlled from a host processor. For autonomous balancing, the circuitry 200 will only balance non-adjacent cells in use (it does not consider inputs used to measure interconnect as cells in use). To avoid excessive power dissipation within the circuitry 200, the maximum number of cells allowed to balance simultaneously can be limited by configuration setting. For host-controlled balancing, adjacent as well as non-adjacent cells can be balanced. Host-controlled balancing can be controlled using specific subcommands sent by the host. The circuitry 200 can return status information regarding how long cells have been balanced through subcommands. The circuitry 200 may automatically balance cells using a voltage-based algorithm based on environmental and system conditions.

Figure 3:
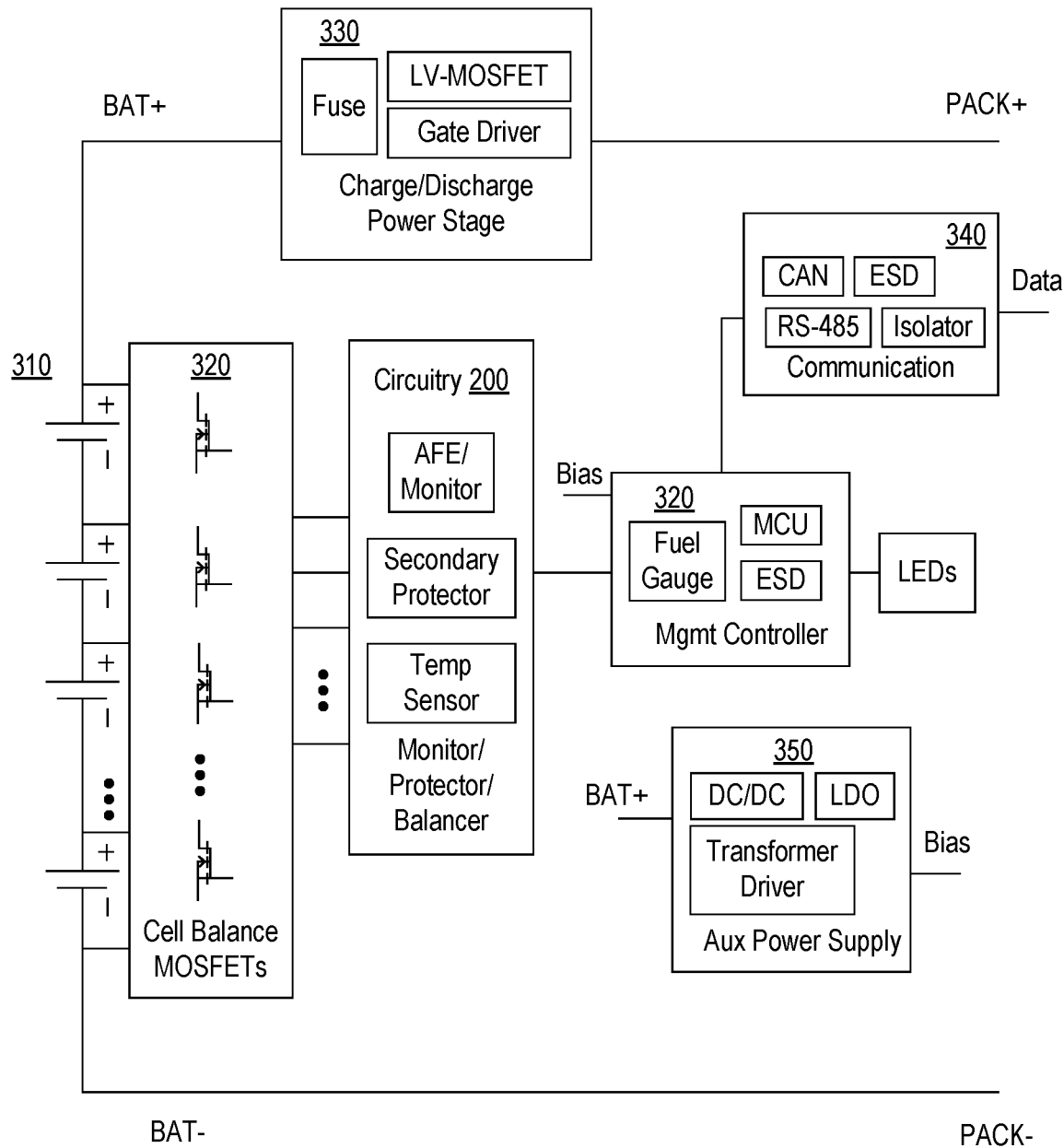
FIG. 3 is a diagram of an example of circuitry.

FIG. 3 shows an example of circuitry 300 that can include the circuitry 200. The circuitry 300 may be suitable for use in various applications. For example, consider a battery pack of an e-bike, e-scooter, light electric vehicle (LEV), etc. Such circuitry can provide for reliable and low-power-consumption battery solutions with protection, monitoring, cell balancing and gauging for e-bikes, e-scooters and light electric vehicles (LEVs).

E-bike, e-scooter and LEV battery packs often require robust protection, accurate indication of state-of-charge, longer storage and idle time and accurate cell voltage measurement and effective cell balancing.

In the example of FIG. 3, the circuitry 300 is coupled to a number of cells 310 where the cells 310 are coupled to cell balancing MOSFETs that are coupled to the circuitry 200, which is shown as including an analog-front end (AFE)/monitor component, a secondary protector component and a temperature sensor component. Output of the circuitry 200 can be received by a management controller 320, which can include a fuel gauge component, a microcontroller (MCU) and an electrostatic discharge (ESD) component. As shown, the management controller 320 may output information via a display such as an LED display (e.g., LEDs).

In the example of FIG. 3, the circuitry 300 can include a charge/discharge power stage 330 that can include a fuse, a LV-MOSFET, and a gate driver. As shown, the charge/discharge power stage is coupled to a positive terminal of the batteries 310 (BAT+) and to a positive pack terminal (PACK+, e.g., a positive battery terminal of the pack of batteries 310). The batteries 310 also include a negative battery terminal (BAT−) that is coupled to a negative pack terminal (PACK−).

In the example of FIG. 3, a communication block 340 includes various components such as a controller area network (CAN) component, an electrostatic discharge (ESD) component, a RS-485 component, and an isolator component. As shown, the communication block 340 can output data, as may be received via the management controller 320.

In the example of FIG. 3, the circuitry 300 can include an auxiliary power supply 350, which can include a DC/DC converter, a transformer driver, and a low drop out voltage regulator (LDO).

In the examples of FIG. 2 and FIG. 3, the circuitry 200 and the circuitry 300 are for use with a single battery pack (e.g., a pack) that can include up to 16 cells in series. As explained, a failure for one of a variety of reasons can result in a shutdown of a pack such that the pack is unusable. The circuitry 200 by itself does not have the ability to handle sustained use of a pack when a single cell or less than all cells may fail or otherwise experience detrimental conditions. Such an approach to a battery management unit (BMU) relies on a design and implemented for a single configuration that loses its function in response to failure of one or more cells.

As an example, a modular BMU can allow for reconfigurations of a pack to thereby allow for more flexible configurations that can isolate one or more cells/blocks and allow for provision of power from one or more other cells/blocks. For example, consider isolating one or more bad cells from one or more good cells; noting that configurations may be implemented for one or more other purposes as well. Where a bad cell exists, the ability to remove a known bad cell/block in a "dead" battery (e.g., a failed pack), for example, could result in a return to new function and second life.

As an example, a modular approach can include a pack management unit (PMU) and a plurality of monitoring units (MUs) that are operatively coupled to the PMU. In such an example, the MUs can include various features of a BMU, which may be a relatively lightweight BMU that provides for monitoring of various cell or block operational parameters (e.g., voltage, current, temperature, etc.). In such an example, the PMU can provide for reconfiguring a pack such that the pack is operable with less than all of its individual cells or blocks of cells, where at least one cell or block of cells remains operable (e.g., as may be subject to one or more criteria, etc.).

Figure 4:
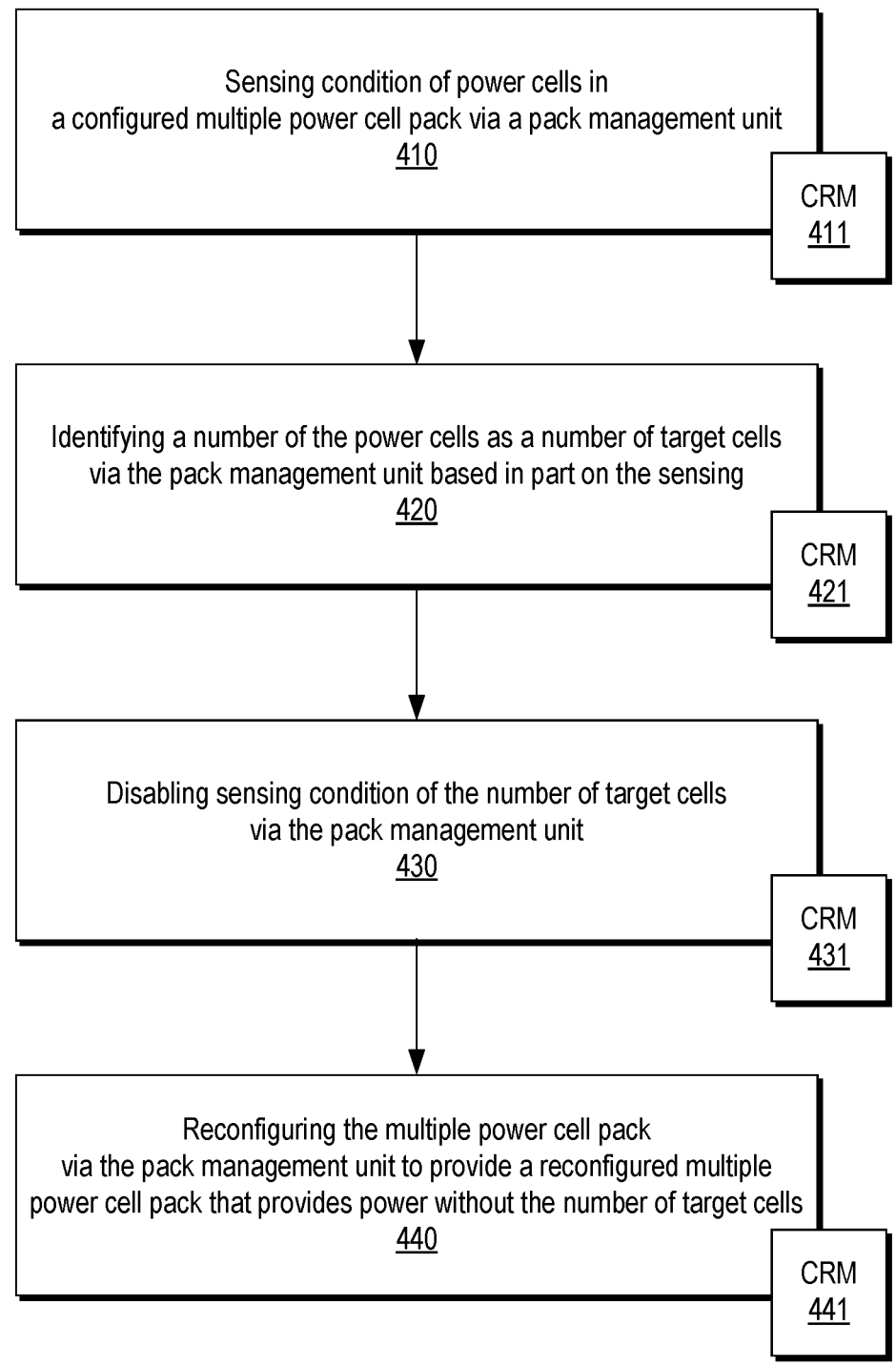
FIG. 4 is a diagram of an example of a method.

FIG. 4 shows an example of a method 400 that includes a sense block 410 for sensing condition of power cells in a configured multiple power cell pack via a pack management unit; an identification block 420 for, based in part on the sensing, identifying a number of the power cells as a number of target cells via the pack management unit; a disable block 430 for disabling sensing condition of the number of target cells via the pack management unit; and a reconfigure block 440 for reconfiguring the multiple power cell pack via the pack management unit to provide a reconfigured multiple power cell pack that provides power without the number of target cells.

In the example of FIG. 4, the method 400 is shown as including one or more computer-readable storage media (CRM) blocks 411, 421, 431 and 441, which can include processor-executable instructions that instruct a device and/or a battery assembly to perform one or more actions of the method 400. A computer-readable storage medium is non-transitory, not a signal and not a wave. A computer-readable storage medium is a physical component that can store information such as, for example, processor-executable instructions.

As an example, a system can include a reset procedure, which may be via a button on a PMU or could be engaged by meeting a set of conditions, like applying power for a specific interval with a delay. On the isolation (e.g., effective removal of a target cell), one of the sense lines (e.g., monitoring lines) would be disabled (e.g., effectively removed). When reset, the PMU can perform a check of all sense lines (e.g., monitoring lines), and, finding a disconnected line (e.g., disabled line), perform a reconfiguration, confirming pack topology and correctness of the new configuration. In such an example, once confirmed, the pack can resume use, which may be with a reduced capacity and/or voltage.

Figure 5:
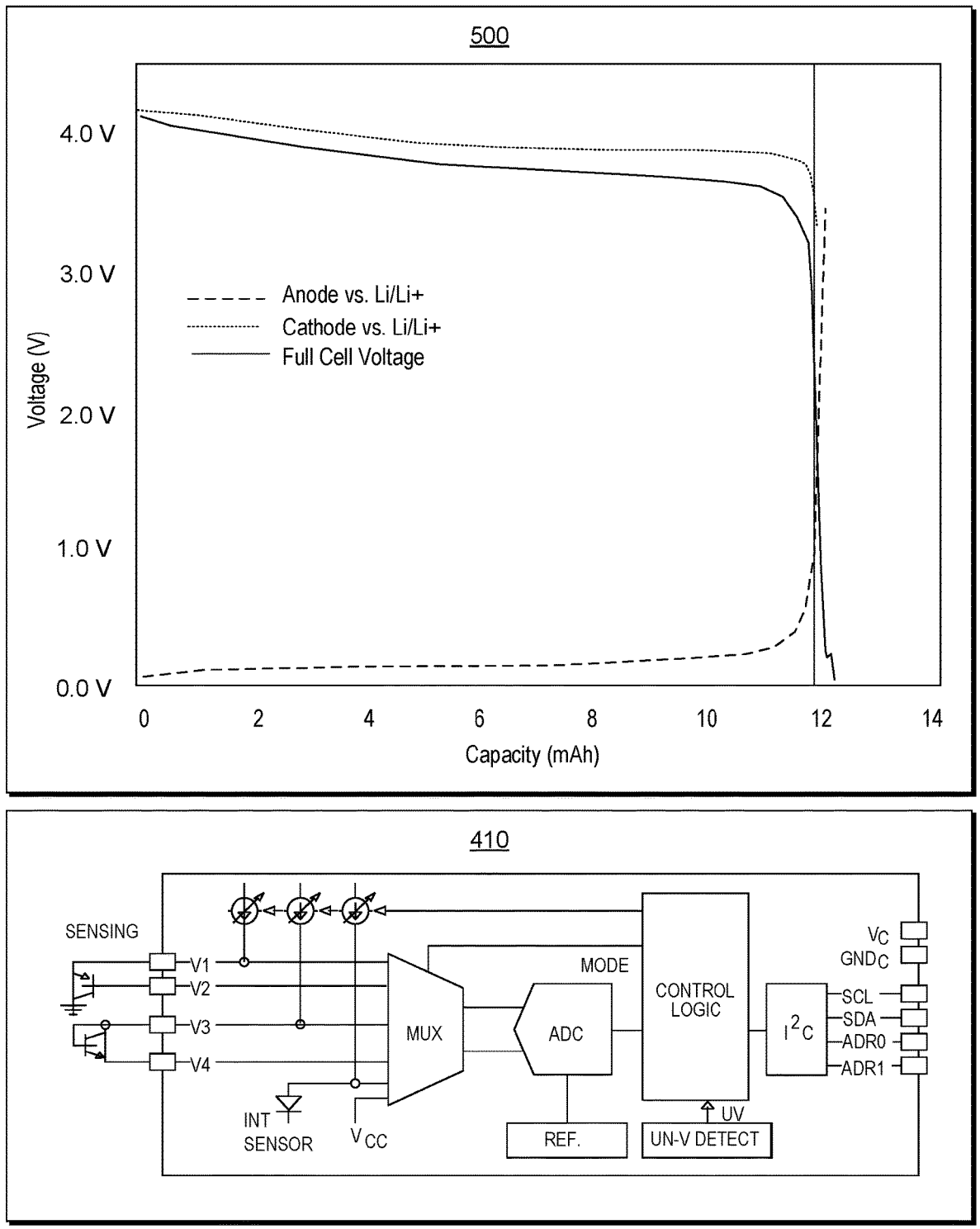
FIG. 5 is a diagram of an example plot of voltage versus capacity and a diagram of an example of circuitry.

FIG. 5 shows an example plot 500 of voltage versus capacity for a discharge rate (e.g., about 0.1 C) and an example of monitoring circuitry 510 (e.g., a monitoring unit, etc.), which may include various features of the circuitry 110 of FIG. 1.

In the example of FIG. 5, the plot 500 provides information as to approximate cut-off voltage limits. As an example, a method can include acquiring information as to an anode voltage, as to cathode voltage and/or as to the difference between a cathode and an anode.

As an example, state-of-health (SOH) information may be acquired and optionally utilized. Capacity of a battery can be a maximum charge that the battery is capable of holding, which, when new may be expected to correspond to a specified capacity (e.g., manufacturer specified capacity). State of charge (SOC) is a measure of how much charge the battery is currently holding as compared to the capacity. SOH can be a metric that can be used to assess how closely a battery meets its design specifications. An assessment as to SOH can involve more than comparing a battery's current capacity with its specified capacity. For example, an undesirably high internal resistance can be an indicator of a less than optimal SOH. As an example, an SOH assessment may be made via measurement of internal resistance of a battery. As an example, a SOH assessment may take one or more other factors into account such as, for example, one or more of temperature and/or pressure, which may be maxima, frequency-based, time-profile(s) (e.g., temperature-time profile, pressure-time profile), etc.

In the example of FIG. 5, the monitoring circuitry 510 includes various components such as a multiplexer (MUX), an analog to digital converter (ADC), control logic, an undervoltage detector and a communication component (e.g., I$^2$C bus coupled component) along with interfaces for inputs and outputs.

As an example, the monitoring circuitry 510 can include one or more features of the LTC 2990 circuitry (Linear Technology Corporation, Milpitas, California). A LTC 2990 datasheet entitled Quad I$^2$C Voltage, Current and Temperature Monitor (Revision F, November 2018, Linear Technology Corporation) is incorporated by reference herein.

The aforementioned LTC 2990 circuitry can be used to monitor temperatures, voltages and currents of an individual cell. For example, such circuitry can be considered to be a monitoring unit (MU), which may be operatively coupled to an overarching PMU (e.g., consider a PMU that can include various features of the circuitry 200, etc.). As an example, the LTC 2990 circuitry can be configured via its serial interface. For example, where operatively coupled to a PMU, the LTC 2990 circuitry (e.g., as a MU) may be configured via the PMU. As an example, a PMU may provide for acquiring information from a MU and, for example, turning on and/or off such acquisition for one or more purposes.

As an example, the LTC 2900 circuitry may be configured in one or more manners and may be switched, for example, via a PMU, etc. For example, consider a voltage, current and temperature configuration, a voltage and temperature configuration, a current and temperature configuration where switching may occur as to configurations. As an example, a cell may include two instances of such circuitry where one instance is configured for measuring voltage and temperature and the other instance is configured to measure current and temperature. In such an example, both instances can be coupled to a PMU where the PMU can receive voltage, current and temperature without adjusting configuration. As an example, circuitry such as the LTC 2900 circuitry may be supplemented with circuitry such as a local switch (e.g., multiplexer, etc.), which may be driven by a clock, a signal, etc., such that the circuitry can acquire various types of information (e.g., voltage, current, temperature, etc.).

As an example, a MU can be relatively low in terms of power utilization. As an example, a MU may be driven by a cell being monitored, a block of cells being monitored, by another cell of a pack, by another block of a pack, another power source, etc.

Referring again to the LTC 2990 circuitry, it can provide sub-millivolt voltage resolution, 1% current measurement and 1 degree C. temperature accuracy (e.g., or any combination of the three). The LTC 2990 circuitry may be utilized to measure temperature via a temperature sensor, which may be in thermal contact with a battery (e.g., directly and/or indirectly). As an example, more than one temperature sensor may be utilized for a single cell or a block of cells where a pack includes a plurality of blocks. As to temperature, phenomena such as diffusion can be dependent on temperature. As an example, circuitry that can measure information as to discharge rate and temperature may be utilized to determine whether or not to effectively remove a cell from a pack. Such an approach may include accounting for diffusion based at least in part on temperature.

As an example, a MU can provide for acquiring measurements that can be utilized to determine one or more of SOH, depth of discharge (DOD), self-discharge, SOC, capacity, current and internal resistance. Such information may be utilized locally by the MU and/or by a PMU to make one or more determinations as to whether or not to maintain a single cell or a single block of cells as electrically coupled to pack terminal(s) of a pack. In such an example, the pack can be operable without that single cell or that block of cells, as may be subject to one or more criteria (e.g., that a sufficient number of other cells are available to provide sufficient power, etc.).

As to DoD, it indicates the percentage of a cell that has been discharged relative to the overall capacity of the cell. DoD can be defined as the capacity that is discharged from a fully charged cell, divided by the cell's nominal capacity. DoD can be expressed as a percentage. For, example, if a 100 Ah cell is discharged for 20 minutes at a current of 50 A, the DoD is 50*20/60/100=16.7%. DoD can be the complement of SOC because, as one increases, the other decreases. While SOC is usually expressed using percentage points (0=empty; 100%=full), DoD can be expressed using units of Ah (e.g., 0 is full and 50 Ah is empty) or percentage points (100% is empty and 0% is full). Capacity of a cell may be higher than its nominal rating. Thus, it is possible for a DoD value to exceed the nominal value (e.g., 55 Ah for a 50 Ah battery, or 110%). As an example, a DoD value may be determined for a block of cells where a pack includes a plurality of blocks.

Self-discharge is a phenomenon in which internal chemical reactions reduce the stored charge of a cell without a connection between the electrodes or any external circuit. Self-discharge decreases the shelf life of a cell and causes a cell to have less than a full charge when actually put to use. How fast self-discharge in a cell occurs is dependent on the type of cell, SOC, charging current, temperature, etc. Self-discharge is a chemical reaction, just as closed-circuit discharge is, and tends to occur more quickly at higher temperatures. Lower temperatures tend to reduce the rate of self-discharge and preserve the initial energy stored in a cell.

As an example, a self-discharge value may be determined for a block of cells where a pack includes a plurality of blocks As an example, a MU can be utilized for a block of cells where a pack includes a plurality of blocks. For example, consider a MU being provided for acquiring information as to a block of cells where the block includes less than six individual cells and where a pack includes more than six blocks of cells. In such an example, a pack can include six MUs and a single PMU where the six MUs can provide information to the single PMU such that the pack can be operable using less than six of the blocks of cells (e.g., and at least a single one of the blocks of cells). As an example, a system for a pack can be a modular system that includes multiple MUs along with a PMU.

Figure 6:
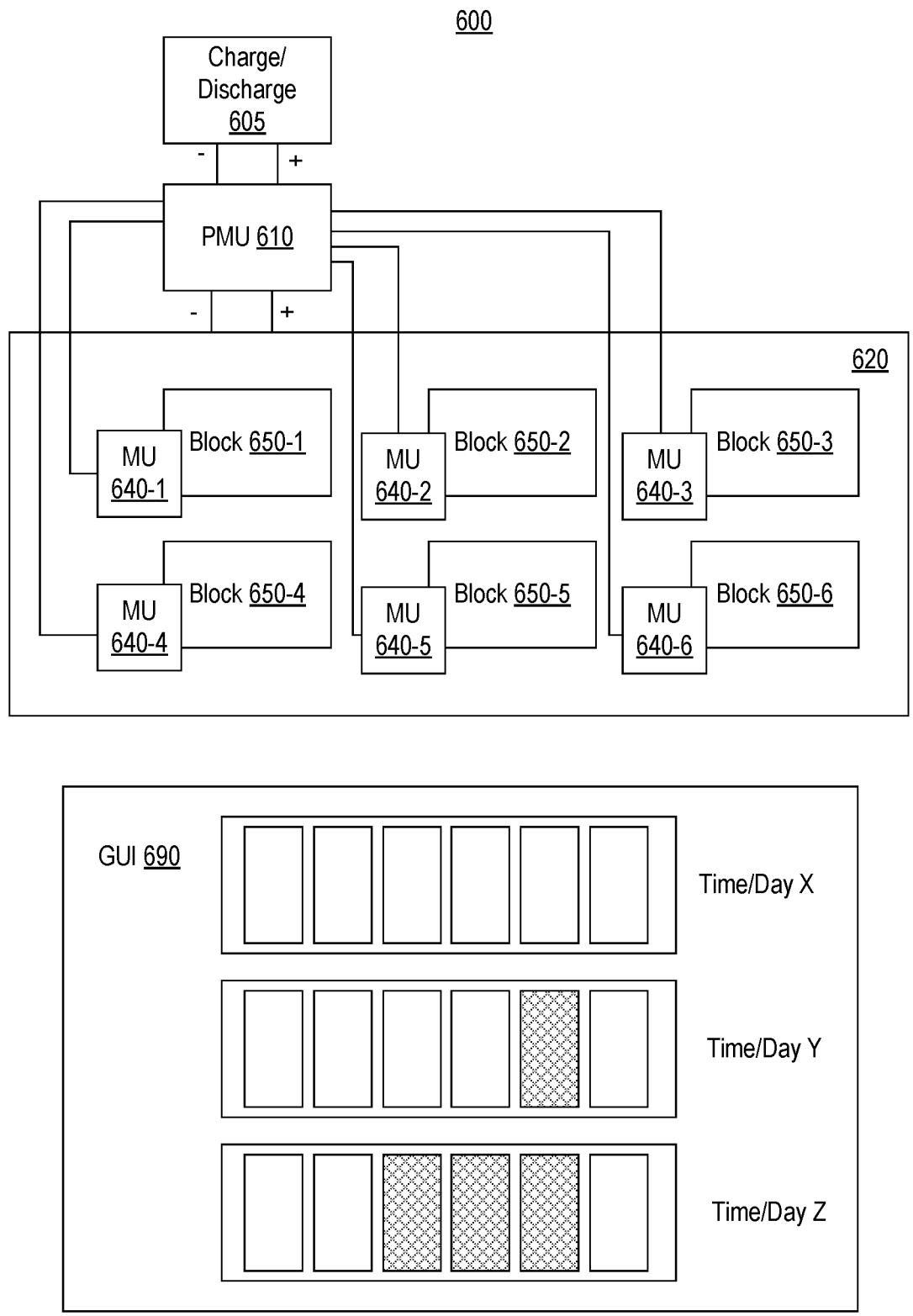
FIG. 6 is a diagram of an example of a system and an example of a graphical user interface (GUI)

FIG. 6 shows an example of a system 600 and an example of a graphical user interface (GUI) 690. In the example of FIG. 6, the system 600 includes a charge/discharge block 605 (e.g., a load and/or a source of power), a PMU 610, and a pack 620. As shown, the pack 620 includes a plurality of blocks 650-1, 650-2, 650-3, 650-4, 650-5 and 650-6, each of which is operatively coupled to a respective MU of MUs 640-1, 640-2, 640-3, 640-4, 640-5 and 640-6. As shown, the MUs 640-1 to 640-6 are operatively coupled to the PMU 610. In the example of FIG. 6, the system 600 can include circuitry such as circuitry of FIG. 1, FIG. 2, FIG. 3, FIG. 5, etc.

In the example of FIG. 6, the system 600 may implement a method such as, for example, the method 400 of FIG. 4. For example, the GUI 690 shows various graphics that represent the six blocks 650-1 to 650-6 where a cross-hatched block indicates that the block no longer contributes to the pack 620 (e.g., for purposes of discharging and/or charging). The GUI 690 can show one or more historical states and/or a current state. As an example, the GUI 690 may indicate other information. For example, consider each graphic in the GUI 690 as being capable of indicating a DoD value, a SOH value, a SOC value, etc. In such an example, an operator may readily determine when a pack may be in need of replacement, a capacity of a pack, etc.

Figure 7:
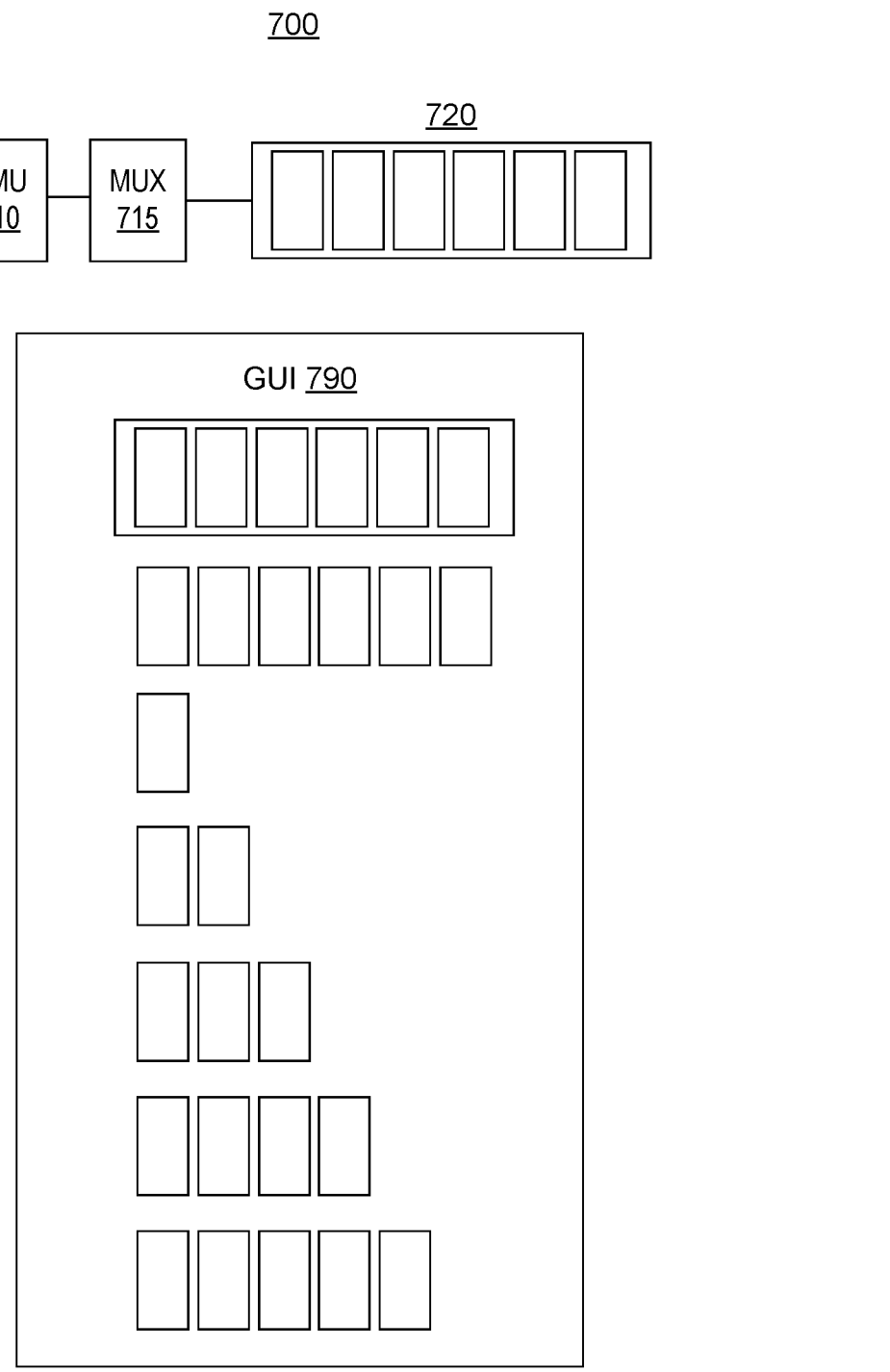
FIG. 7 is a diagram of an example of a system and an example of a graphical user interface (GUI)

FIG. 7 shows an example of a system 700 and an example of a GUI 790 where the system 700 includes a PMU 710, a multiplexer (MUX) 715 controllable by the PMU 710, and a pack 720 that includes a plurality of blocks and corresponding MUs, noting that each of the blocks may be a single cell or a plurality of cells. As shown in FIG. 7, via the GUI 790, the PMU 710 and MUX 715 can configure the pack 720 in a variety of manners. For example, all blocks of the pack 720 may provide output to satisfy a load (e.g., a computing device, a vehicle, etc.), individual blocks of the pack 720 may provide output to satisfy a plurality of loads, a single block or another number of the blocks may provide output to satisfy a load and/or a plurality of loads.

Figure 8:
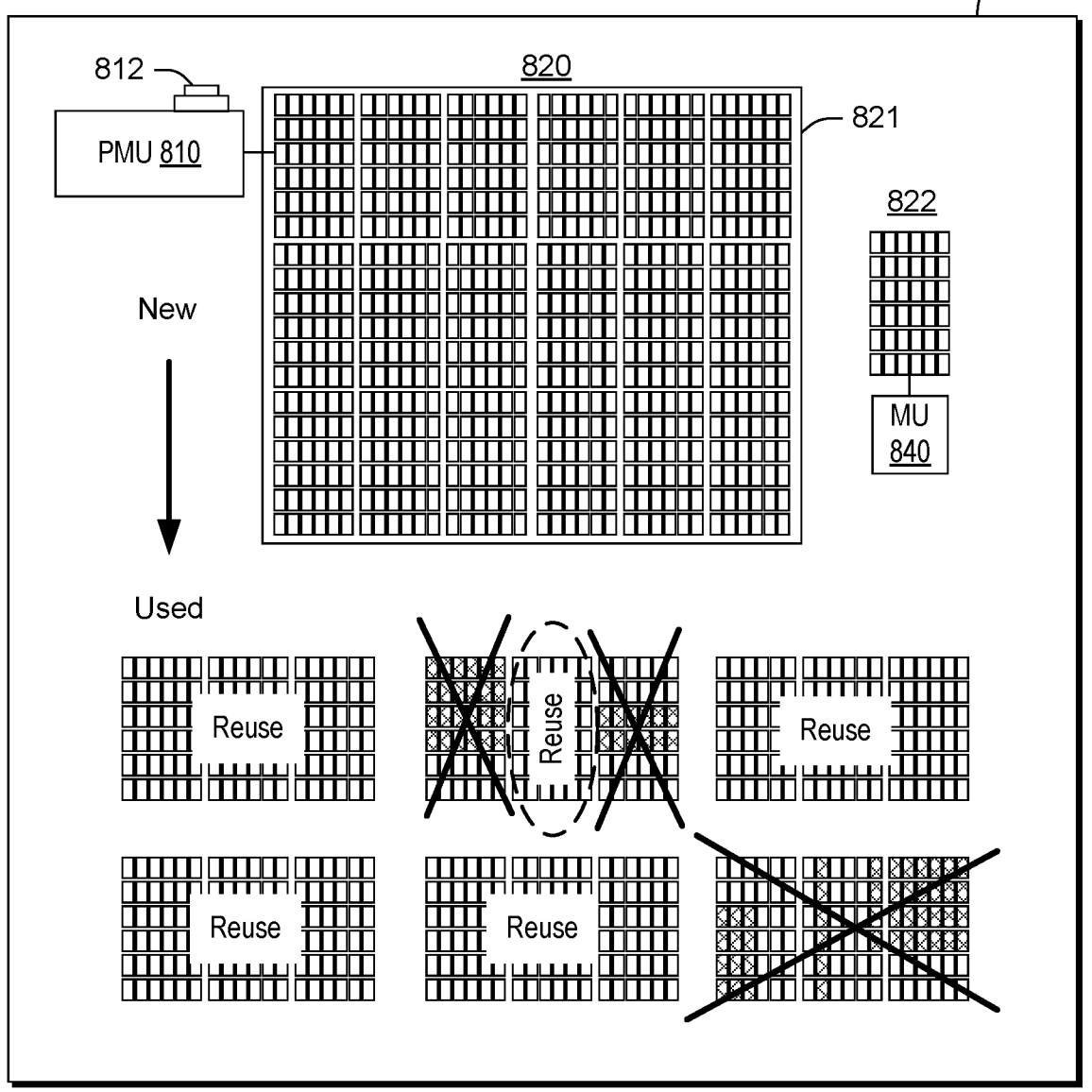
FIG. 8 is a diagram of an example of a device and an example of a system.

FIG. 8 shows a block diagram of a device 800 and an example of a PMU 810 operatively coupled to a pack 820, which can include a frame 821. As shown, the device 800 can include circuitry that may be powered by a lithium-ion cell or cells (e.g., a pack). As to the device 800, consider one or more of a cell phone, a tablet, a camera, a GPS device, a notebook computer, a power tool, a portable power pack, an e-vehicle (an electric motor of an electric vehicle or a hybrid vehicle), etc., that may be powered by a lithium-ion cell or cells (e.g., a block, a pack, etc.). A device may be a scooter, an automobile, a toy, a remote control device (e.g., a bomb sniffers, drones, etc.), etc. A device may include one or more processors 802, memory 804, one or more network interfaces 806, one or more displays 808 and, as a power source, one or more lithium-ion cells 809. As an example, a device may include electric motor or electric motors.

In the example of FIG. 8, the pack 820 can be made of blocks 822 where each of the blocks 820 is operatively coupled to its own MU 840 such that the pack 820 has a plurality of MUs 840. In such an example, the pack 820 may be assembled by positioning the blocks 822 into the frame 821 or other structure that can accommodate the blocks 822 to form the pack 820 and provide for operatively coupling the pack 820 to the PMU 810 and each MU 840 to the PMU 810. In the example of FIG. 8, the PMU 810 is shown as including an actuator 812, which may be a button that can provide a reset function (e.g., reset to reconfigure, etc.). For example, consider a signal being issues that indicates one or more of the blocks 820 have an issue or issues where, upon actuating the actuator 812, the PMU 810 can reconfigure the pack 820 to provide power without using the one or more of the blocks 820 that have an issue or issues.

As an example, each of the blocks 822 may be utilized for one or more purposes. For example, consider a field operation site where the pack 820 is delivered to the site where each of the blocks 822 may be already charged or charged. In such an example, one or more field operations may take place using equipment powered by the pack 820 and/or one or more field operations may take place using equipment powered by one or more of the blocks 822. In such an example, each of the blocks 822 may be assembled or disassembled from the pack 820 for use locally or a distance from the site.

As an example, consider a fleet of vehicles where a main vehicle can transport the fleet where the main vehicle is powered by the pack 820. Once the main vehicle arrives at a destination, the pack 820 may be disassembled such that a number of the blocks 822 can be coupled to an individual vehicle of the fleet. In such an example, consider e-bikes where a truck can carry the e-bikes to a site while being powered by the pack 820 and where, once at the site, the pack 820 can at least in part by disassembled such that blocks 822 can be installed into the e-bikes. In such an example, the e-bikes may be utilized as appropriately powered via the blocks 822 for a period of time where the e-bikes may be driven a distance from the site. In such an example, the e-bikes may be driven back to the site where the blocks 822 can be reassembled to form the pack 820 for powering the truck. In such an example, the pack 820 may include a number of dedicated blocks that provide for reaching a home site where, for example, some of the blocks 822 may have been depleted of power or otherwise rendered non-operational.

As an example, the pack 820 may be utilized for a vehicle where the vehicle can be driven to a site where equipment may be at the site and/or where the vehicle carries equipment to the site. In such an example, blocks 822 may be utilized separately from the pack alone or in various combinations. In such an example, utilization may scale from a single one of the blocks 822 to several of the blocks 822 to the pack 820 as including the blocks 822. For example, consider a communication device, to a computing device, to satellite equipment, to lighting equipment, to launch equipment (e.g., guns, etc.), to a vehicle (e.g., an entire pack, etc.).

As an example, consider a truck that can carry power tools to a site where a pack may provide power to the truck and where the pack can be at least in part disaggregated to power individual power tools, which may be of the same type or of different types. For example, consider a home construction scenario where various types of power tools may be utilized, from nailers, to drills, to saws, to heaters, etc. In such an example, a worker or workers may remove individual cells or blocks from the pack for use to power such types of power tools. In such an example, the pack may include sufficient power to achieve a particular construction goal, as may be part of a construction plan. At the end of a workday, at least some of the cells, blocks, etc., may be returned to the pack where they may be recharged and ready for subsequent use, where they remain operational. In such an example, a PMU may make determinations as to whether such cells, blocks, etc., remain operational. Where they do not, a GUI may be rendered to a display to that identifies those that are not operational and/or one or more LEDs may be illuminated to indicate a status (e.g., red is not operational, yellow is weakly operational, and green is suitably operational). Such indications can facilitate workflow where workers are to pull cells or blocks from a pack for use in tools.

As an example, some uses may involve removing one or more of the blocks 822 from a frame of the pack 820 and some uses may involve using one or more of the blocks 822 without removing the one or more of the blocks 822 from the frame. Where one or more of the blocks 822 are utilized while in the frame of the pack, one or more switches, connectors, etc., may be utilized to decouple the one or more of the blocks 822 from one or more other of the blocks 822. As explained, a pack can be configurable and reconfigurable, which can include automated configuration and/or automated reconfiguration. As explained, configuration and/or reconfiguration of cells or blocks of cells may be performed while such cells or blocks remain in a frame of a pack or where such cells or blocks are removed from a frame of the pack.

As an example, a pack can include a plug-n-play type of interface that allows for plugging in a cell or a block such that a PMU can recognize the presence of the cell or the block. As explained, such an interface can provide for operatively coupling of a MU to a PMU or, for example, a pack may include a number of MUs where a cell or a block of cells (e.g., without MUs) can be plugged into the pack for utilization of a respective one of the MUs. In such examples, the PMU can provide for configuring and/or reconfiguring the pack.

In the example of FIG. 8, the pack 820 can include a new state where all of the cells are operational where, after some period of time, the pack can be in a used state where a number of the cells are no longer suitable for operational use. In such an example, the pack 820 can be disaggregated (e.g., broken-up) such that portions of the pack 820 can be reused. In such an example, cells may be repurposed for one or more uses to power one or more devices. In such an example, the cells being repurposed may be repurposed for use with a single BMU or with a PMU and MUs. For example, MUs may be repurposed and operatively coupled with a PMU for repurposed use.

As an example, a method can include disaggregating a pack and repurposing good cells of the pack. In such an example, MUs may be associated with the good cells where the MUs may be repurposed along with the good cells. In such an approach, a trickledown scheme may be utilized that aims to get the most out of cells, as opposed to disposal of a pack of cells just because failure of one or more of the cells of the pack make the pack no longer useful. In the example of FIG. 8, repurposing may be repeated until the cells of the original pack 820 are no longer suitable for use.

As explained with respect to the e-bike example, where one or more of the blocks 822 is no longer suitable for operation, it may be appropriately discarded while a good block can be reused. For example, the pack 820 may be assembled for a particular purpose where upon one or more of the blocks 822 going bad, the one or more of the blocks 822 may be replaced. In such an example, the pack 820 can be modular with the PMU 810 and individual MUs 840 that provide for various use scenarios and/or reuse scenarios.

Figure 9:
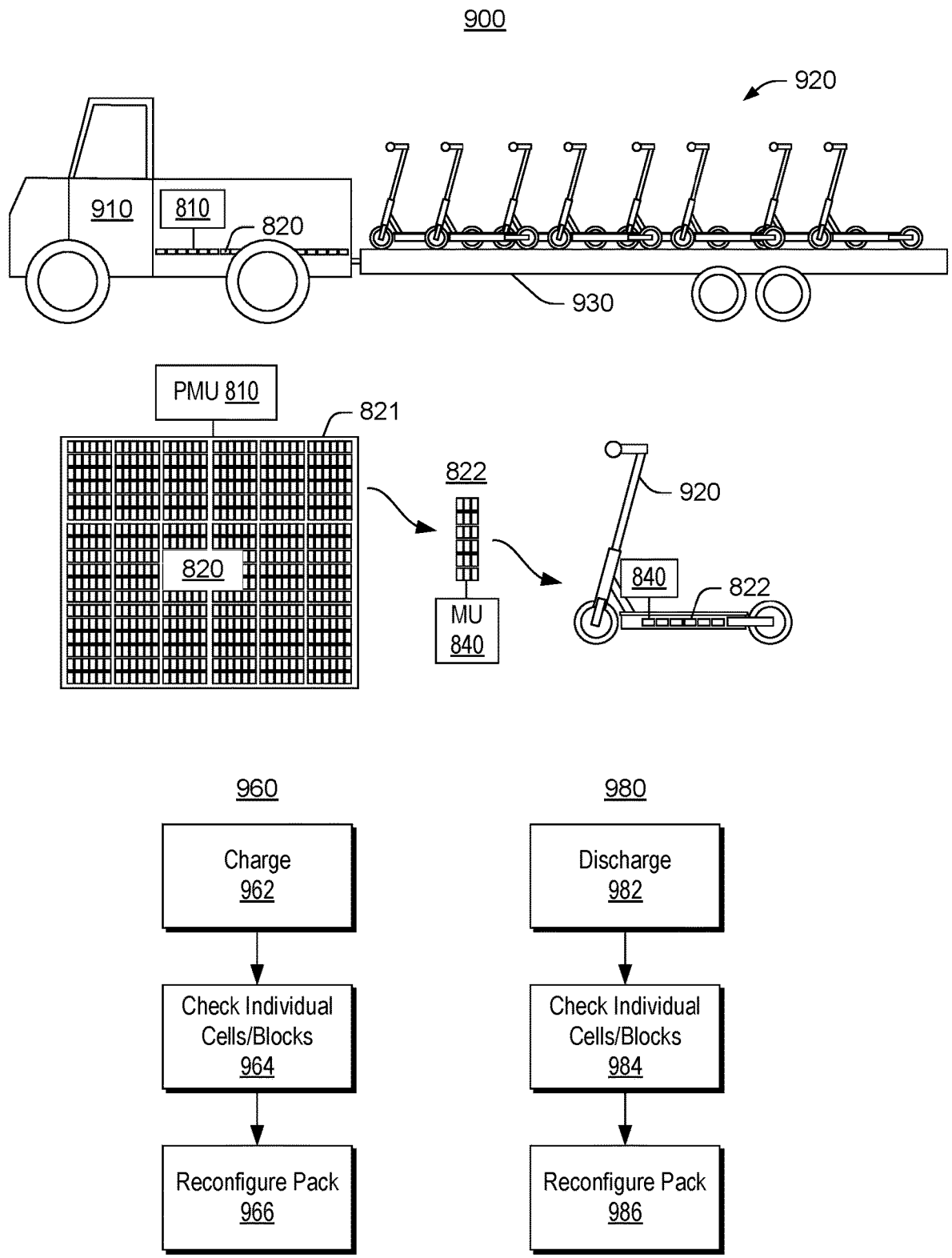
FIG. 9 is a series of diagrams of a system and examples of methods.

FIG. 9 shows an example of a system 900 and examples of methods 960 and 980. As shown, the system 900 can include a vehicle 910 that includes the PMU 810 and the pack 820 and can include a fleet of devices 920 that are illustrated as e-scooters in the example of FIG. 9 capable of being transported on a trailer 930 that can be towed by the vehicle 910. In such an example, the pack 820 can be defined according to the individual blocks 822 where each of the blocks 822 can have its own MU 840. As an example, the vehicle 910 may be an e-vehicle that may carry more than one of the packs 820 and/or one or more other packs. As shown, the individual blocks 822 may be suitable for use in individual members of the fleet of devices 920 where, for one of the fleet of devices 920, the MU 840 can provide for one or more battery management tasks. As shown in the example of FIG. 9, the pack 820 may include over 100 cells arranged in the blocks 822. For example, consider the PMU 810 as being able to be operatively coupled to each of the blocks 822 where each of the blocks 822 includes a number of cells operatively coupled to a respective MU 840.

As an example, a pack may be tiered, for example, consider 16 cells per block and 16 blocks per pack. In such an example, a PMU can be operatively coupled to 16 MUs. In such an example, each MU may be operatively coupled to each of the 16 cells in its block. In such an example, circuitry that includes various features of the circuitry 110, the circuitry 200, the circuitry 300, the circuitry 410, etc., may be utilized (e.g., in a multi-level or tiered manner, etc.).

As an example, a lifecycle may involve using the pack 820 to power the vehicle 910 until a number of the blocks 822 become inoperable (e.g., go bad) while the PMU can reconfigure the pack 820 until that number is reached (e.g., consider a number greater than two, etc.). In such an example, the pack 820 can be disaggregated such that the operable blocks 822 (e.g., good blocks) can be installed in respective devices such as of the fleet of devices 920 where such blocks are managed at least in part by their respective MUs 840. Such a lifecycle may be contrasted to a scenario where, once a block of a pack goes bad, the entire pack is discarded.

As explained, a method can include disaggregating the pack 820 to install at least some of the blocks 822 into devices such as, for example, at least some of the fleet of devices 920. And, once the devices are finished being used, the blocks 822 can be returned to the pack 820, for example, to power the vehicle 910 and/or to be charged (e.g., consider being charged via an electrical power generator of the vehicle 910 as may be powered via an internal combustion engine, a hydrogen engine, etc.).

As an example, the PMU 810 may provide for configuring or reconfiguring the pack 820 during charging and/or during discharging. For example, the method 960 includes a charge block 962 for charging a pack, a check block 964 for checking individual cells/blocks of the pack, and a reconfigure block 966 for reconfiguring the pack where, for example, sufficiently charged individual cells/blocks (e.g., according to one or more criteria) can be taken off charge power. In such an example, MUs of the individual cells/blocks can be utilized to provide information as to one or more parameters (e.g., consider SOC and/or related parameters, etc.). As explained, a pack can be provided with switches, which may be part of MUs and/or otherwise provided. In such an example, where reconfiguring can occur during charging, a method may reduce risk of damage to one or more individual cells/blocks and/or utilize charge power more effectively.

As to the method 980, it includes a discharge block 980 for discharging a pack, a check block 984 for checking individual cells/blocks of the pack, and a reconfigure block 986 for reconfiguring the pack where, for example, individual cells/blocks can be effectively removed from the pack (e.g., via appropriate switching, etc.) while the pack remains viable for supplying power to a load or loads.

As explained, a PMU and multiple MUs approach to pack management can provide for reconfiguration during charging and/or during discharging. As explained, a PMU and multiple MUs approach to pack management can provide for an extended lifecycle of units of a pack. As explained, a PMU and multiple MUs approach can provide for various use cases such as, for example, use cases where a pack can be at least in part disaggregated, which may allow for multiple uses of units of a single pack (e.g., in combination as a pack and as individual cells/blocks of the pack).

Figure 10:
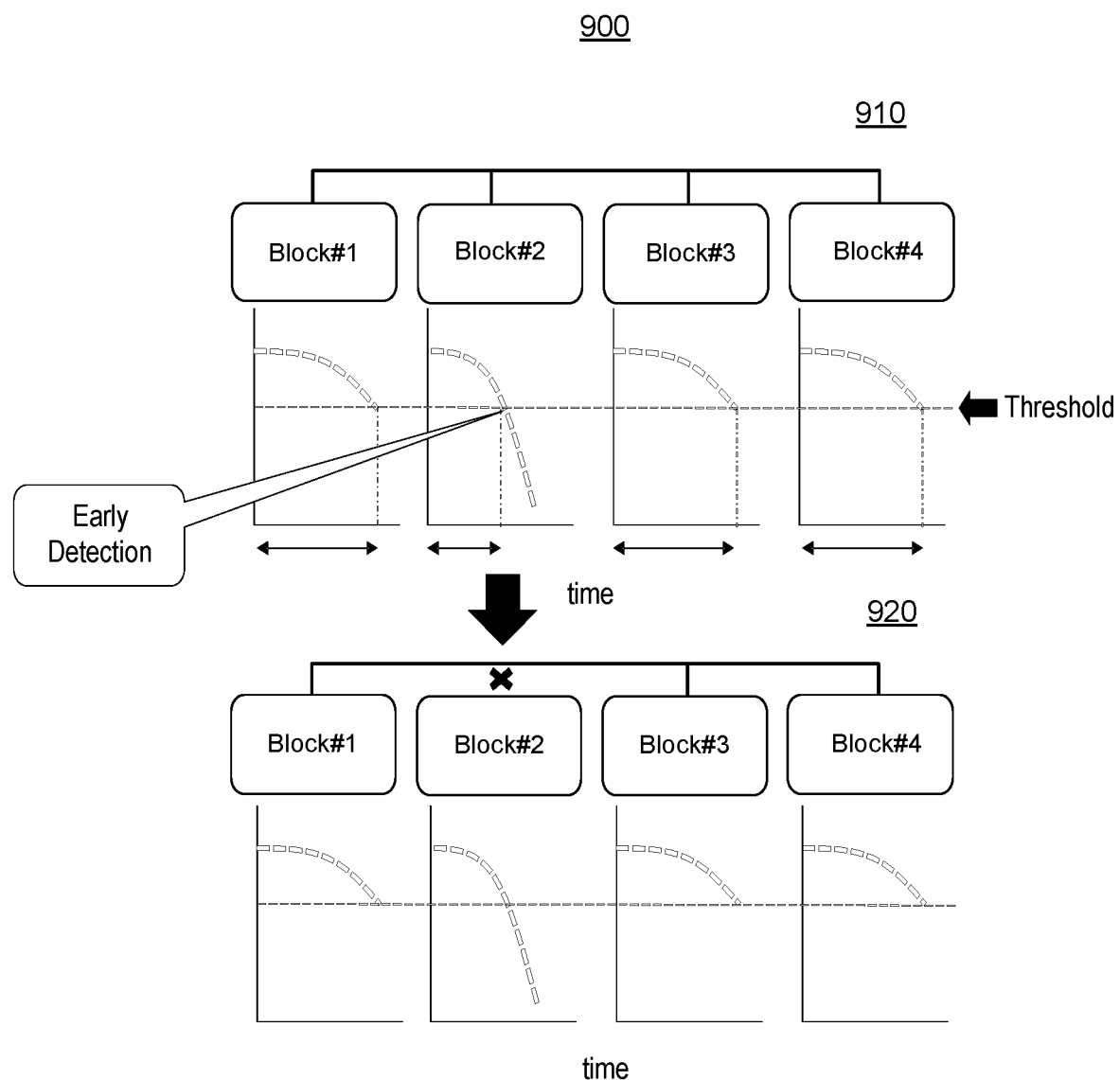
FIG. 10 is a diagram of an example of a method.

FIG. 10 shows an example of a method 1000 that includes implementing sensed condition and rule logic to determine whether or not to take a block of a plurality of blocks of a pack offline. The method 1000 can include detecting a condition via sensing 1010 and reconfiguring based on the sensing 1020. As shown, self-discharge profiles may be generated via sensed information as sensed by a plurality of MUs associated with corresponding blocks (e.g., #1, #2, #3 and #4). As shown, the profiles can be with respect to time and can be assessed using a threshold, which may be a threshold common to all of the blocks. Where a block has a short time to reach the threshold, the short time can indicate that an issue exists with respect to the block. Given such a determination, the block can be taken off line while the pack can continue to operate (e.g., to charge, discharge, etc.).

As explained with respect to the method 400 of FIG. 4, self-discharge can be based on sensed condition where a cell or a block can be identified as a target cell or a target block. In such an example, logic can be applied to effectively remove the target cell or target block as a power supplying cell or block of a pack.

As explained, a pack can have cells/blocks go bad where, without appropriate features, a single bad cell/block results in an unusable pack. As explained, the circuitry 200, by itself, can be a BMU that is designed and implemented for a single pack configuration where the pack loses its function where an issue occurs with any of the cells/blocks in the pack. In such a scenario, the entire pack may be scrapped (e.g., disposed of), without regard to cells/blocks in the pack that may still be operational, whether to meet the original function of the pack or for repurposing.

As explained, a PMU operatively coupled to MUs can provide a modular BMU system that allows for reconfiguration to allow for more flexible configurations such as isolating the bad cells/blocks from the good (e.g., suitably functioning) ones. Effectively removing a known bad cell/block in a "dead" pack, for example, can result in a return to function of a pack and/or a second life (e.g. via repurposing one or more cells/blocks, etc.).

As explained, a PMU can implement a reset procedure, which may be a button on the PMU, itself, or that may be automatically engaged by meeting one or more conditions (e.g., like applying power for a specific interval with a delay). On the effective removal of a bad cell, a sense line (e.g., a MU line, etc.) may be disabled (e.g., effectively removed). Upon a reset, a PMU can check the sense lines and, after identifying an effectively disconnected line, perform a reconfiguration, confirming pack topology and correctness of the new configuration. Once confirmed, the pack can go back into use, albeit with one or more of reduced abilities (e.g., capacity, voltage, etc.).

As an example, a method can include accessing one or more operating system associated functions. For example, various WINDOW® operating systems include a powercfg command that can generate a battery report (e.g., powercfg/batteryreport/output"C:\battery_report.html" to generate the HTML file at the particular storage location). As an example, a method can include generating one or more reports and extracting information from such one or more reports. In such an example, the information may be utilized to determine a configuration of a pack. Such a report can include design capacity of a pack and full charge capacity of a pack. Such a report can include usage information such as, for example, "Recent Usage", as to time, state (active, suspended), power source and remaining capacity of the pack. Such information can show when a device went to sleep, became active, and or was charged with AC power along with the mWh capacity. As to SOH, information as to life estimates may be extracted from such a pack report.

As an example, a PMU with MUs may be implemented in a manner such as described with respect to FIG. 7 to provide for one or more operations of a device that may demand different levels of power. For example, consider a parked state of a vehicle where power demand may be minimal (e.g., communications, some amount of lighting, heating, cooling, etc.). In such an example, a PMU with MUs can reconfigure a pack to provide for the lower power demand by supplying power from the pack from fewer than all cells of the pack. As an example, a PMU with MUs can provide for one or more types of power supply strategies such as utilizing a number of cells in series and/or in parallel (e.g., to provide a particular capacity or to provide a particular voltage with the same capacity). As an example, where a device or system to be powered includes communication circuitry, a PMU with MUs approach may be utilized to configure (e.g., or reconfigure) a pack for purposes of operation of the communication circuitry. For example, consider a vehicle where it may be stationary and where a particular cell, cells, block or blocks may be configured to provide power to the communication circuitry. In such an example, once a call or other communication is completed, the PMU may reconfigure the pack (e.g., to commence driving, etc.).

As an example, a pack may be utilized in a facility that includes computing devices. For example, consider a server facility where the pack may be a back-up power pack. In such an example, the pack may be configured to supply power to particular servers in the server facility, which may be in use during a power outage.

As an example, a pack may be made of a plurality of blocks where the blocks can be individually usable or otherwise usable in combination separately from the pack. As explained, a pack may be utilized as part of a fleet of devices where individual cells or blocks can be taken from the pack for use in the devices of the fleet. In such an example, the pack may provide for use to power equipment associated with the fleet. As explained, equipment associated with a fleet of devices may be a vehicle that can transport the fleet, computing equipment that can process data acquired via the fleet of devices where they may include one or more sensors, etc. While an e-bike fleet is mentioned, consider one or more other types of land-based fleets (e.g., scooters, four-wheeled vehicles, etc.), water-based fleets (e.g., boats or other watercraft), air-based fleets (e.g., drones), etc. Such fleets may be transported by a vehicle that utilizes power provided by a pack where the fleet devices can utilize power provided by individual cells or blocks of the pack.

As an example, an individual cell or an individual block can include its own MU, which can be a BMU, the individual cell or individual block can be ready for use with at least its own monitoring capabilities. As an example, an interface may be provided such that a MU can communicate with a controller of a device. For example, consider a e-bike where a controller of the e-bike can communicate with a MU of a block of cells where the block of cells can be installed into a pack where the pack includes a PMU that can communicate with the MU (e.g., at least receive information from the MU). While an e-bike is mentioned, various types of devices may be utilized in such a scenario or scenarios (see, e.g., the fleet of devices 920 of FIG. 9, etc.). As an example, a device may include a SMBus where the SMBus can be operatively coupled to a MU of an individual cell or a block of cells where the individual cell or the block of cells can be utilized to form a pack where a PMU is operatively coupled to the pack.

As explained, a PMU with MUs approach to pack management can provide for configuration and reconfiguration of a pack, which may be utilized for one or more purposes. As explained, a purpose can be to extend usage of a pack and/or to tailor output of a pack.

As an example, a method can include sensing condition of power cells in a configured multiple power cell pack via a pack management unit (PMU); based in part on the sensing, identifying a number of the power cells as a number of target cells via the pack management unit; disabling sensing condition of the number of target cells via the pack management unit; and reconfiguring the multiple power cell pack via the pack management unit to provide a reconfigured multiple power cell pack that provides power without the number of target cells. In such an example, the sensing condition can include sensing voltage via a plurality of monitoring units (MUs). For example, the multiple power cell pack (e.g., pack) can include a number of cells that may be organized as blocks where each cell or each block has a dedicated monitoring unit (MU) that can sense voltage of a corresponding cell or block. In such an example, sensed voltage may be utilized for one or more purposes such as, for example, to determine self-discharge rate, etc. In such an approach, where a self-discharge rate is high or time to a threshold value is small (e.g., relative to a predetermined value, one or more other cells, blocks, etc.), the cell or block may be identified as a target cell or a target block for consideration in effectively removing the cell or block from use within the pack.

As an example, a method can include sensing temperature via a plurality of monitoring units. In such an example, where temperature indicates an issue for a cell or a block, the cell or block may be identified as a target cell or a target block for consideration in effectively removing the cell or block from use within the pack. For example, a low temperature may indicate a performance issue (e.g., lack of chemical processes, etc.) and a high temperature may indicate a performance issue (e.g., excessive energy generation, etc.).

As an example, a configured multiple power cell pack can include more than four individual power cell units. For example, consider a pack with at least four cells or a pack with at least four blocks where each block can be considered to be an individual power cell unit. As such a power cell unit may refer to a single power cell or a block of power cells where a pack includes a number of blocks that is greater than one (e.g., consider greater than four, etc.).

As an example, a method can include reconfiguring a pack in a manner that occurs automatically after disabling one or more sense lines, which may involve disabling one or more MUs. In such an example, where one or more MUs are disabled, the power consumed by the one or more MUs can be conserved and/or power expended by a PMU may be conserved in having to acquire and/or process information as would be received by the one or more MUs if not disabled. As an example, reconfiguring may occur responsive to receipt of a reconfigure signal. For example, consider a reset button operatively coupled to a PMU that is actuatable to issue the reconfigure signal.

As an example, a method can include providing power to a system via a reconfigured multiple power cell pack. In such an example, the system may be one or more of a computing system, may be a vehicle system, may be a portable tool system, etc.

As explained, a PMU can be operatively coupled to a plurality of monitoring units (MUs) (e.g., integrally and/or separately). As an example, a method can include, responsive to identifying a number of target cells (e.g., one or more target cells), disabling a monitoring unit (MU) that corresponds to the number of target cells. As explained, a MU may be provided on a cell-by-cell basis or a block-by-block basis for a pack that includes a plurality of blocks.

As an example, a method can include identifying a number of target cells by utilizing at least one rule. For example, consider at least one discharge profile threshold. As explained, a discharge profile may be a self-discharge profile for a cell or a block. As an example, discharge profiles may be compared where, using one or more rules, at least a shortest discharge time to a threshold value may be utilized for identifying a number of target cells.

As an example, a method can include rendering a graphic of a reconfigured multiple power cell pack that indicates operative power cells and inoperative power cells. In such an example, a number of target cells can included in the inoperative power cells.

As an example, a method can include issuing a signal that indicates a capacity and/or a voltage of a reconfigured multiple power cell pack. In such an example, an operator, a control system, etc., can be informed of how reconfiguration has impacted the pack.

As an example, a pack management unit can include a processor; memory accessible to the processor; processor-executable instructions stored in the memory and executable to instruct the pack management unit to: sense condition of power cells in a configured multiple power cell pack; based in part on the sensed condition of the power cells, identify a number of the power cells as a number of target cells; disable the sense condition of the number of target cells; and reconfigure the multiple power cell pack to provide a reconfigured multiple power cell pack that provides power without the number of target cells. As explained, a PMU can receive information from monitoring units where each power cell in a pack or each block of power cells in a pack can have an associated monitoring unit. Such an approach may provide for a modular BMU architecture that can reconfigure a pack such that pack usability may be extended and, for example, such that cells and/or blocks may be repurposed where pack usability is no longer available. Such an approach is in contrast to an approach where a single BMU considers a pack to be no longer usable once a cell or a block has experienced an issue that makes the cell or the block no longer usable. A single BMU approach for a pack can be charging focused where an issue related to charging can result in a decision that the entire pack is unusable.

As an example, one or more computer-readable storage media can include processor-executable instructions executable to instruct a pack management unit to: sense condition of power cells in a configured multiple power cell pack; based in part on the sensed condition of the power cells, identify a number of the power cells as a number of target cells; disable the sense condition of the number of target cells; and reconfigure the multiple power cell pack to provide a reconfigured multiple power cell pack that provides power without the number of target cells.

As an example, a method may be implemented in part via instructions stored in memory accessible by a processor where the instructions include executable instructions executable by a processor (e.g., processor-executable instructions), which may be a CPU, a microcontroller (e.g., such as a reduced instruction set computing (RISC) microcontroller), etc. In such an example, the instructions may optionally be firmware instructions. As an example, a battery assembly may include memory, accessible by a processor, that stores processor-executable instructions, which may be, for example, firmware instructions (e.g., stored in the memory during manufacture of the battery assembly and optionally updatable).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable medium that includes computer-executable instructions. As described herein, a computer-readable medium may be a storage device (e.g., a memory card, a storage disk, etc.) and referred to as a computer-readable storage medium. As an example, circuitry can be processor-based in that the circuitry includes a processor (e.g., or processors) and/or is operatively coupled to a processor (e.g., or processors).

Figure 11:
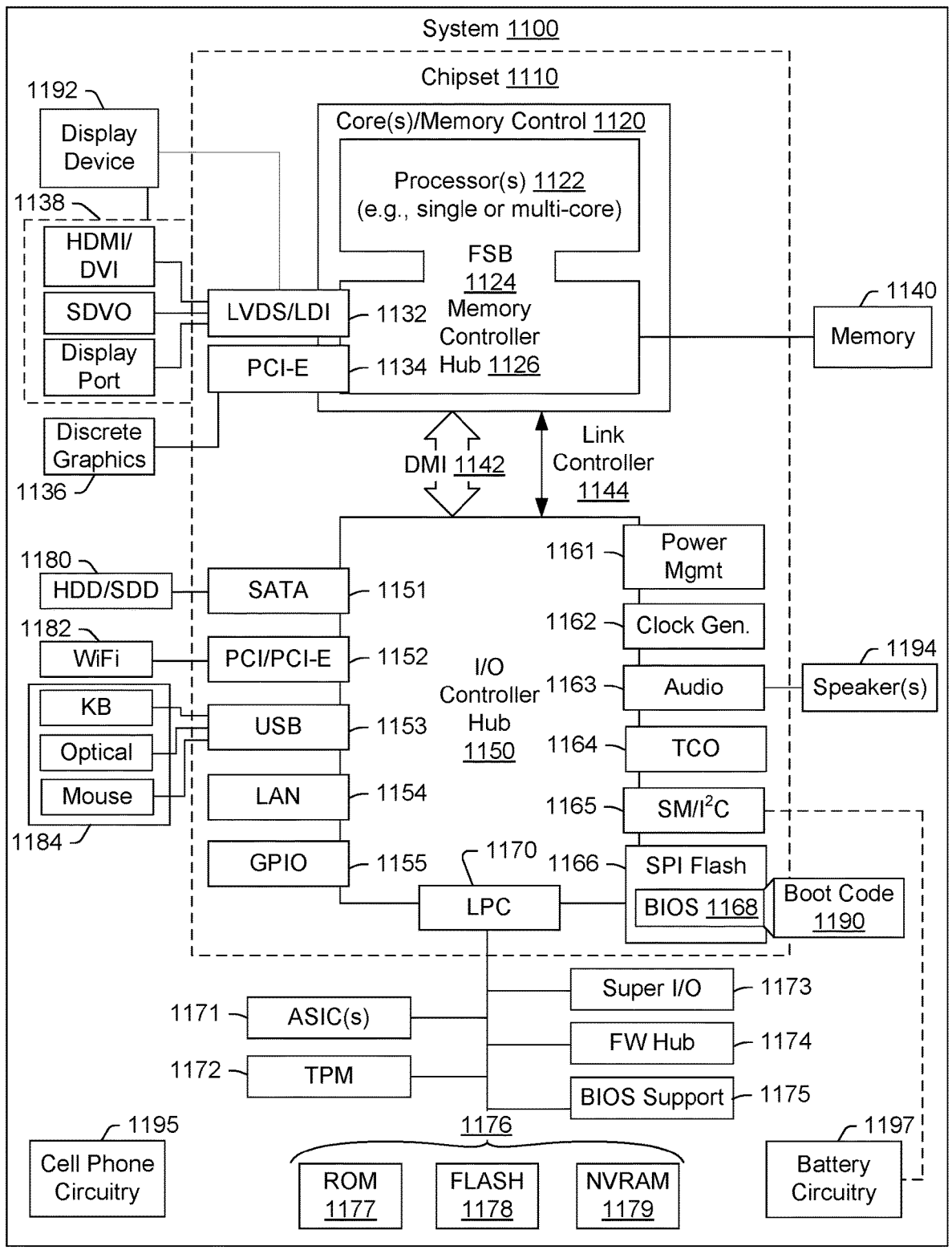
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a satellite, a base, a server or other machine may include other features or only some of the features of the system 1100. As described herein, a device such as the device 800 of FIG. 8, the fleet of devices 920 of FIG. 9, the vehicle 910 of FIG. 9, etc., may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an I²C interface (see, e.g., the SM/I²C interface 1165), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
 sensing condition of power cells in a configured multiple power cell pack via a pack management unit;
 based in part on the sensing, identifying a number of the power cells as a number of target cells via the pack management unit;
 disabling sensing condition of the number of target cells via the pack management unit; and
 reconfiguring the multiple power cell pack via the pack management unit to provide a reconfigured multiple power cell pack that provides power without the number of target cells.

2. The method of claim 1, wherein the sensing condition comprises sensing voltage via a plurality of monitoring units.

3. The method of claim 1, wherein the sensing condition comprises sensing temperature via a plurality of monitoring units.

4. The method of claim 1, wherein the configured multiple power cell pack comprises more than four individual power cell units.

5. The method of claim 1, wherein the reconfiguring occurs automatically after the disabling.

6. The method of claim 1, wherein the reconfiguring occurs responsive to receipt of a reconfigure signal.

7. The method of claim 6, wherein a reset button operatively coupled to the pack management unit is actuatable to issue the reconfigure signal.

8. The method of claim 1, comprising providing power to a system via the reconfigured multiple power cell pack.

9. The method of claim 8, wherein the system comprises a computing system.

10. The method of claim 8, wherein the system comprises a vehicle system.

11. The method of claim 8, wherein the system comprises a portable tool system.

12. The method of claim 1, wherein the pack management unit is operatively coupled to a plurality of monitoring units.

13. The method of claim 12, comprising, responsive to the identifying, disabling the monitoring unit that corresponds to the number of target cells.

14. The method of claim 1, wherein the identifying comprises utilizing at least one rule.

15. The method of claim 14, wherein the at least one rule comprises at least one discharge profile threshold.

16. The method of claim 1, comprising rendering a graphic of the reconfigured multiple power cell pack that indicates operative power cells and inoperative power cells, wherein the number of target cells is included in the inoperative power cells.

17. The method of claim 1, comprising issuing a signal that indicates a capacity of the reconfigured multiple power cell pack.

18. The method of claim 1, comprising issuing a signal that indicates a voltage of the reconfigured multiple power cell pack.

19. A pack management unit comprising:
 a processor;
 memory accessible to the processor;
 processor-executable instructions stored in the memory and executable to instruct the pack management unit to:
  sense condition of power cells in a configured multiple power cell pack;
  based in part on the sensed condition of the power cells, identify a number of the power cells as a number of target cells;
  disable the sense condition of the number of target cells; and
  reconfigure the multiple power cell pack to provide a reconfigured multiple power cell pack that provides power without the number of target cells.

20. One or more computer-readable storage media comprising processor-executable instructions executable to instruct a pack management unit to:
 sense condition of power cells in a configured multiple power cell pack;
 based in part on the sensed condition of the power cells, identify a number of the power cells as a number of target cells;
 disable the sense condition of the number of target cells; and
 reconfigure the multiple power cell pack to provide a reconfigured multiple power cell pack that provides power without the number of target cells.

* * * * *